Sept. 9, 1947.  J. A. CRAIG  2,426,984
EXPANDING HOSE REEL
Filed Oct. 30, 1940  2 Sheets-Sheet 1
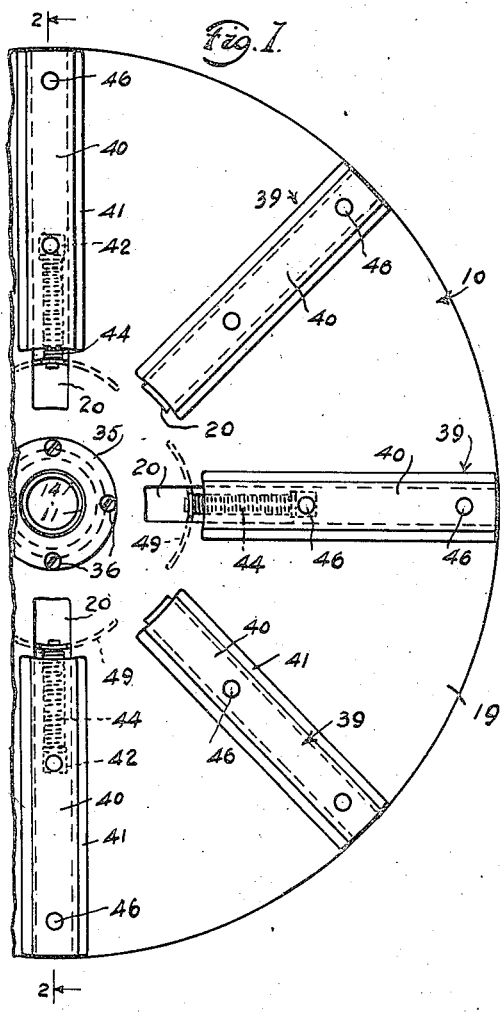
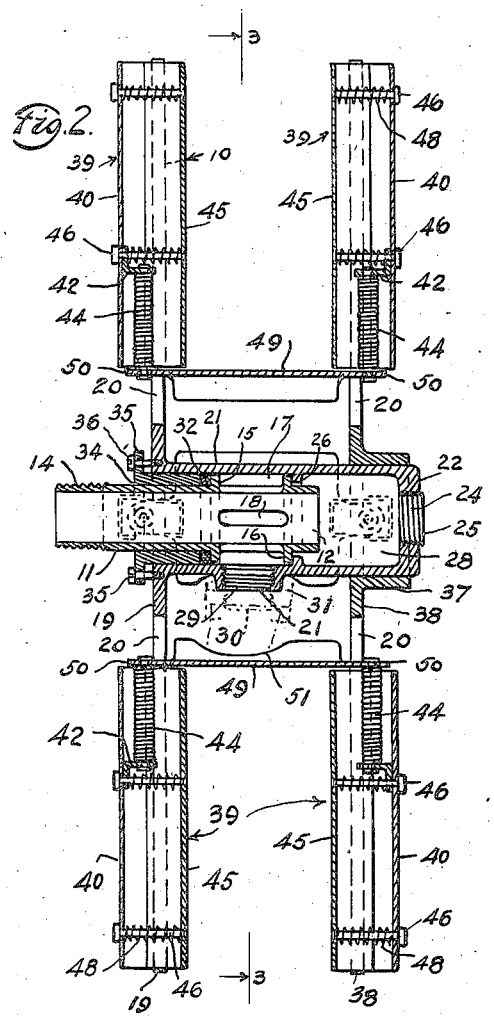
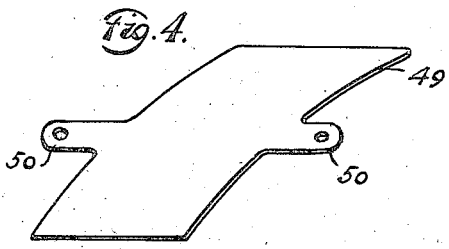
INVENTOR,
James A. Craig
BY
Harold D. Pemmey

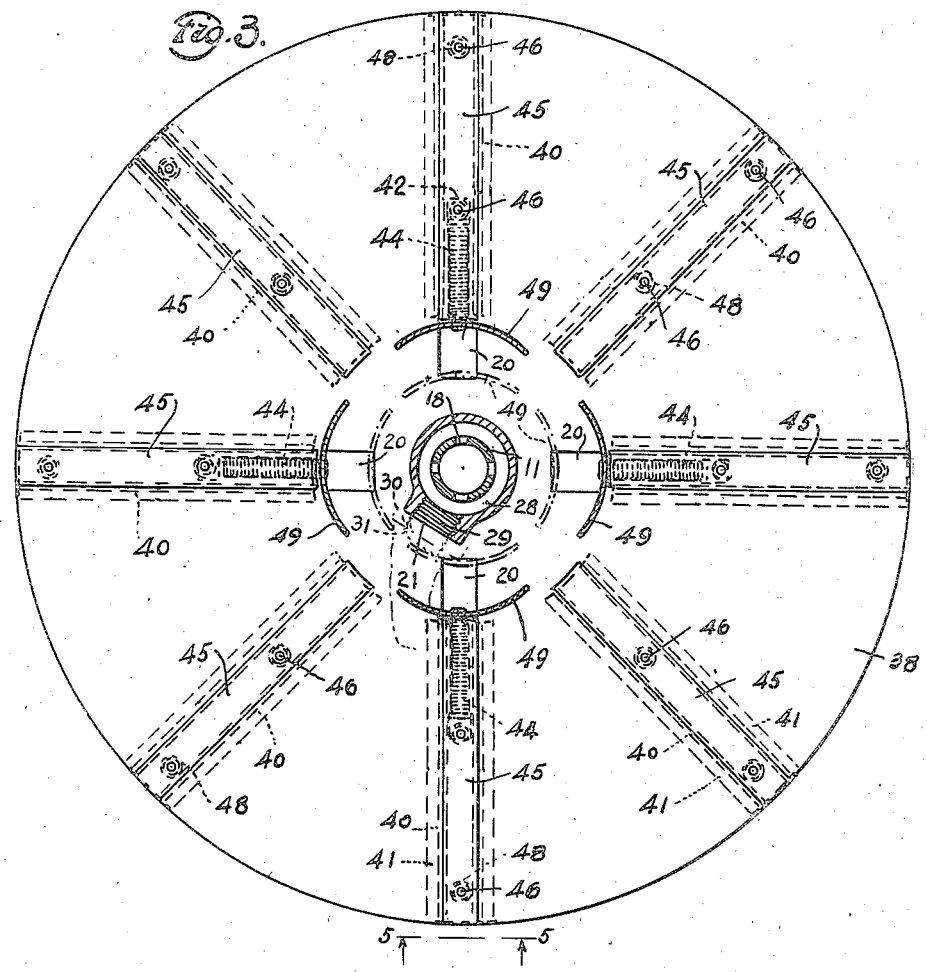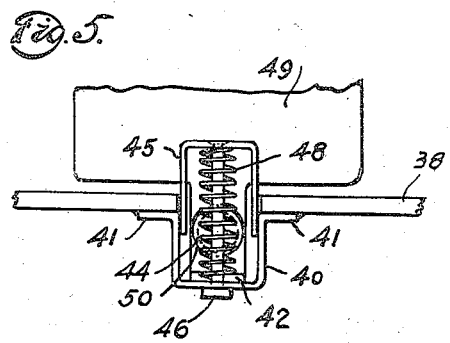

Patented Sept. 9, 1947

2,426,984

UNITED STATES PATENT OFFICE 2,426,984

EXPANDING HOSE REEL

James A. Craig, Fishkill, N. Y., assignor to Jeannette Hoehne, Danbury, Conn., and Margaret Craig, Fishkill, N. Y.

Application October 30, 1940, Serial No. 363,535

14 Claims. (Cl. 242—86)

This invention relates to hose reels and more particularly to devices for enabling a flow of water from a collapsible hose while wound on a reel.

One object of the invention is to provide an improved reel of this kind which allows the drum portion of a hose reel to decrease in diameter and permits smooth winding of the hose thereon and to avoid kinks in the hose.

Another object of the invention is to provide an improved reel spoke of this kind which yields laterally over its entire length to an increased bulk of the hose when water is turned on.

Additional objects of the invention are to effect simplicity and efficiency in such apparatus and to provide an extremely simple reel of this kind which is economical, durable, and reliable in operation, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a hose reel, which briefly stated, includes a hub rotatably mounted on an inlet pipe and having a hose communicating therewith. Side pieces are mounted on the ends of said hub and provided with spokes having outwardly yieldable inner walls adapted to engage the sides of the hose. The drum of the reel comprises segmental curved plates mounted around the hub and yieldably movable toward the axis of the reel, whereby the drum as well as the spokes will yield to a flow of water through the hose wound on the reel to allow free passage of the water.

In the accompanying drawing showing, by way of example, one of many possible embodiments of the invention, Fig. 1 is a fragmental elevation, showing the reel;

Fig. 2 is a longitudinal vertical sectional view of the reel, the section being taken substantially on the line 2—2 of Fig. 1, looking in the direction of the arrows of said line;

Fig. 3 is a transverse vertical sectional view, partly in elevation, showing the reel, the section being taken substantially on the line 3—3 of Fig. 2, looking in the direction of the arrows of said line;

Fig. 4 is a perspective view of a drum plate; and

Fig. 5 is a fragmental elevation, showing the end of a reel spoke, looking in the direction of the arrows of line 5—5 of Fig. 3.

The collapsible hose reel is shown mounted on an inlet pipe 11, Fig. 2, having an open free end 12 and a threaded inlet end 14 and having thereon first and second spaced ribs 15 and 16 at the outlet portion of the pipe, sufficiently spaced apart to form a water passage 17 between them. The pipe 11 is provided with a plurality of peripherally spaced longitudinal water outlet slots 18 between said first and second ribs or collars 15 and 16.

An inner disk 19 is provided with a plurality of radial slots 20 Fig. 1 and has a hub 21 open toward the inlet end of the pipe and provided with an outer end wall 22 having a threaded hole 24 therein stoppered by a plug 25. The hub is mounted around said pipe 11 on said ribs 15, 16 and has an internal rib 26 engaging the outer side face of the rib 16.

The second rib 16 and the rib 26 position the hub 19 with said wall 22 spaced from the open end 12 of the pipe to form a cushioning air chamber 28 therebetween to prevent water hammer. The hub is provided with a threaded lateral water outlet opening 29 communicating with the passage 17 and adapted to receive a nipple 30 in engaging a hose coupling 31.

A packing ring 32 between said pipe and hub engages the outer face of said first collar 15 and a packing gland 34 provided with a perforated flange 35 overhanging the outer face of said inner disk 19 engages said packing ring between said pipe 11 and said hub 21 to compress said ring 32 to make the connection watertight. Adjustment of the gland is accomplished by means of adjusting screws 36 in the perforations of the flange 35 and engaging in holes in the inlet portion of the disk 19.

An outer side disk 38 is provided with a central boss 37 and has a plurality of radial slots 20. The boss 37 is mounted fast on the outer end of the hub 21. The pairs of slots 20 in the inner and outer disks 19 and 38 are in planes radial to the hub axis.

Composite spokes 39 mounted on said disks 19 and 38, each includes an elongated channel member 40, Fig. 5 mounted over one of the slots, the walls of said member being disposed inwardly and provided with out-turned flanges 41 welded to the outer faces of the disks at the margins of the slots.

A bracket 42, Fig. 2, is mounted on the inner face of the web of the channel member 40 somewhat near the inner end thereof; and a longitudinal tension spring 44 in the channel has one end attached to said bracket 42, the other extending toward the center of the reel.

An inner channel shaped transversely telescoping member 45 received in the channel member 40, and projecting inwardly through one of the slots 20 in the disks has its walls engaged with the walls of the channel member 40, the webs of said members being spaced and opposite to form a tubular space to receive said springs 44. Pins 46 located to clear the tension springs 44, are loosely received in holes in the web of the channel member 40 and riveted or otherwise secured to the web of the telescoping member 45 and carry compressible springs 48 thereon between the webs of said members to render the inner member 45 outwardly yieldable.

The normally spaced curved segmental winding plates 49, Fig. 4, provided with a pair of opposite outstanding ears 50 at the mid-portions of the sides of the plates are attached to the inner ends of pairs of said tension springs 44 in the pairs of spokes to form an approximately cylindrical normally yieldable segmental winding drum. The slots 20 receive the ears 50, and the walls of said slots serve to guide said ears and thereby to guide the plates 49 toward and away from the hub 21. One or more of said plates is provided with a cut out 51 Fig. 2 to provide a space for the passage of the hose to allow movement of the plates near the hose.

The yieldable drum affords a smooth surface for the hose and prevents kinks where the winding radius is shortest and where the kinks would be most likely to occur. The smooth surface also allows better slippage of the hose coils, and thus enables them to move into positions where they offer less resistance to the flow of water through the hose.

In operation, when the water is turned on while hose is wound on the reel, the collapsed hose swells, the drum plates yield toward the axis of the reel and the inner walls of the spokes yield outwardly, thus allowing the hose to be free of constriction, thereby allowing a large stream of water to pass through the hose and be available before the hose has been unwound.

The segment members 49 cooperate to form a drum of small diameter around which hose may be wound; and the outer face of said drum when the segment members 49 are at their inner limit of movement, as shown by the broken lines of Fig. 3, is of substantially the same radius as said segments, which are at such limit coaxial with the hub and almost in contact with each other, each segment having a width in circumferential direction of approximately 90 degrees and, at said inner limit, at least approximately three and a half times as great as the distance between adjacent segments when at said inner limit, and great enough in relation to the distance between segment members to substantially eliminate kinking the hose at the segments. Said segment members provide a broad smooth area of contact with the hose, thereby to apply hose pressure to a wide area of the segment member, so that the usual increase in the hose pressure throughout the segment member will be sufficient to elongate the springs. Since the springs 44 are tension springs of the form shown, the strength of such is so related to the size of said areas of the segment members that the hose when empty will be firmly held more remote from the hub and when under water pressure will easily move inwardly to allow a large stream of water to pass throughout the hose.

As shown by Fig. 2, the interspace between opposite members 45 is large enough to receive several superposed layers of fire hose disposed side-by-side.

The tension springs 44 are intermediate laterally bendable helical springs having room to bend in the slots 20, whereby each segment member 49 may tilt substantially on an axis passing through the inner ends of its associated springs, each segment member 49 being so wide in circumferential direction that the oncoming water easily tilts the member away from the hose to avoid pinching the hose and the resulting shock, surge and delay of water flow.

Having thus described the invention what is claimed is:

1. In a collapsible hose reel having a hub; opposed side disks having a plurality of inwardly and peripherally open radial slots and mounted on each end portion of said hub, said slots having substantially parallel side walls and extending near to said hub, pairs of slots of the respective disks being in planes radial to the hub axis; composite transversely telescoping spokes mounted in said slots, each spoke including a pair of reversely nested elongated channel members extending toward the central end of said slots, and compression springs between the members for resisting movement of one of said members in the direction away from the opposite disk; tension springs mounted in said spokes and having ends extendable to the central ends of said slots; a plurality of drum segments substantially parallel to the axis of said hub guided in registering pairs of said slots and attached to the extendable ends of springs associated therewith; whereby when water is turned into a collapsed hose wound on said reel the yieldable spoke members will yield over their entire length and afford increased distance between registering spokes, and the drum segments will yield toward the axis of the reel being stopped only by the central ends of the slots.

2. A collapsible hose reel having a hub; side disks having a plurality of inwardly and peripherally open radial slots and mounted on said hub, said slots having substantially parallel side walls, pairs of slots of the respective disks being in planes radial to the hub axis; composite spokes mounted on said disks, each spoke including an elongated channel member mounted over and along one of the slots, the walls of said member being disposed inwardly and provided with outturned flanges mounted on the outer face of said disk and along the marginal portion of said slot; a channel-like transversely telescoping member shorter than said slots, received in said channel member, the walls of the telescoping member engaged with the walls of the channel member, the webs of said telescoping member and said channel member being spaced and opposite to form a tubular space from the periphery of the disk toward the hub; a longitudinal tension spring in said space and having one end attached to one of said members and the other end projecting toward the axis of the reel; retaining means for holding said members together and permitting inwardly transverse telescoping movement; compressible springs between the webs of said members to form a spoke of yieldably varying width; normally spaced winding plates curved on a longitudinal axis and having opposed outstanding ears guided in registering pairs of said slots and attached to the centrally directed ends of said tension springs to form a yieldable winding drum, whereby the winding drum and the spokes will yield on the increase of bulk of the hose when water is turned on and allow free passage of the water.

3. A hose reel comprising, in combination, a hub; opposed side disks mounted on each end of said hub and providing a hose winding space therebetween, said disks being provided with corresponding radial slots extending near to said hub and substantially lying in the same radial plane; receiving channel members mounted on the outer face of said disks over said slots so that the channels of said members are open toward said slots and winding space; inner channel members in said slots and transversely telescoped in said receiving members to form tube-like spokes; means for holding the receiving and inner members in engagement for telescoping transverse movement of the inner members in the receiving members; drum segments traversing said space and having projections at each end thereof received in corresponding radial slots for radial movement in said slots, said inner members being beyond the outer limit of movement of said segments, and resilient means attached to said projections and channel members and remote from the space between said segments and said hub for resisting movement of the segments toward the hub.

4. In a collapsible hose reel, spoke mounting means on each end of the reel; composite spokes mounted on said means each spoke including an elongate outer channel piece having parallel walls and a web and provided with wall flanges extending substantially perpendicular to the channel piece walls and mounting the pieces on said means; an elongate inner channel piece engaging in said outer channel piece, the webs of said pieces being opposite each other, and holding means to hold the two pieces in engagement for telescoping transverse movement of said inner piece with respect to said outer piece, whereby the two engaged pieces form a tubular spoke having a uniformly outwardly yieldable inner wall.

5. In a hose reel having a hub; spoke mounting means at each end of said hub; opposed sets of radial spokes disposed in parallel planes and mounted on said means to form a hose winding interspace between said sets of spokes; each spoke comprising a rigid channel-shaped outer member mounted fast on the mounting means and having its channel open toward spokes of the other set; said member being rigid to prevent the spoke sets at their outer end portions from flexing and spreading and permitting a hose in coils to slip off the reel; an inner spoke member inwardly received in the channel of each outer member and having a face presented adjacent to said interspace; the inner member being movable uniformly away from said spoke; resilient means resiliently holding the inner member in the outer member for transverse movement of the inner member in the outer member and away from said space throughout the entire length of the inner member; whereby when water is turned into a collapsed hose in said interspace, each of said inner members may outwardly move independently of the others and increase the distance between the inner members of one set and the inner members of the opposed set.

6. In a hose reel having a hub, spoke mounting means on each end of the hub; sets of radial spokes mounted on said means and adjacent the respective ends of said hub to form a hose winding interspace between said sets of spokes; each spoke comprising a radial rigid outer member mounted on said means; a radial inner member in said outer member and having an inner face adjacent to said interspace, and resilient means for holding the inner members in engagement with the outer members for movement theretoward in a plane radial to said hub; winding drum segments substantially parallel to the axis of said hub and traversing said interspace; and a pair of longitudinal radial springs attaching each of asid segments to a pair of registering spokes, the springs being more remote from the hub than is the segment whereby when water is turned into a collapsed hose in said interspace, each of said inner members may outwardly move independently of each other and increase the distance between the inner faces of the inner members of the opposed sets of spokes and the segments will normally yield toward the axis of the hub.

7. In a collapsible hose reel, spoke mounting means on each end of the reel; composite spokes mounted on said means, each spoke including an elongate outer channel piece having parallel walls and a web and provided with wall flanges extending substantially perpendicular to the channel piece walls and mounting the pieces on said means; an elongate inner channel piece engaging in said outer channel piece, the webs of said pieces being opposite each other; and holding means to hold the two pieces in engagement for telescoping transverse movement of said inner piece with respect to said outer piece, whereby the two engaged pieces form a tubular spoke having a uniformly outwardly yieldable inner wall; said holding means being headed pins longer than the walls of the pieces loosely engaging holes in the web of he outer piece and secured to the web of the inner piece and compressible springs between and engaging the webs of said pieces.

8. A hose reel spoke comprising an elongated outer channel member having a web having holes therein, and side walls; a transversely telescoping inner channel-shaped member received in, and telescoping transversely to, said channel member and having a web and side walls, the walls of the inner member engaging with the inner face of the walls of the channel member, the walls of the inner member extending from its web toward the web of the channel member; means for guiding the inner member for transverse telescoping movement toward and from the web of the channel member; and compressible springs mounted between the webs of said members to allow the inner web to yield laterally and provide a spoke of yieldably varying width.

9. A hose reel spoke comprising an elongated outer channel member having a web having holes therein, and side walls; a transversely telescoping inner channel-shaped member received in said channel member and having a web and side walls, the outer faces of the walls of the inner member engaging with the inner faces of the walls of the channel member, the walls of the inner member extending from its web toward the web of the channel members; and pins transverse to said members and loosely received in the holes in the web of the channel member and secured to the web of the inner member; and compressible springs on said pins between the webs of said members to allow the inner member to yield laterally and provide a spoke of yieldably varying width.

10. A hose reel comprising a hub; a mounting structure fast on each end of the hub and lying in a plane perpendicular to the hub axis, said structures providing therebetween a space; hose engaging pieces associated with and mounted on each structure and extending in a direction outwardly away from said axis in a direction substantially parallel to said planes and adjacent to said space, the pieces being mounted for movement toward the associated structure, the pieces of the respective structure providing a hose winding interspace therebetween wide and deep enough to receive fire hose coiled thereon, said pieces being provided adjacent to said interspace with continuous smooth inner faces free from projections; and resilient means interposed between said pieces and the associated mounting structure for yieldably resisting movement of the retaining pieces toward the associated structure, and allowing empty fire hose disposed between opposite engaging pieces to expand laterally when water and pressure is applied to the hose.

11. A hose reel comprising a hub; a mounting structure fast on each end of said hub lying in a plane perpendicular to the axis of said hub; said structures providing an interspace therebetween; hose engaging pieces associated with and mounted on each structure and extending in a direction outwardly away from said axis in directions substantially parallel to said planes and adjacent to said interspace, the pieces being mounted for movement toward and from the associated structure, the pieces at one end of the hub being long enough and far enough from the pieces at the other end to provide an interspace wide and deep enough to receive superposed convolutions of fire hose; said pieces being provided adjacent to said interspace with continuous smooth faces free from projection; and resilient means interposed between the hose retaining pieces and the associated mounting structure for yieldably resisting movement of the engaging pieces toward their respective associated structures to allow fire hose in said interspace to laterally expand when water under pressure commences to pass therethrough.

12. A hose reel comprising a hub; a supporting structure mounted fast on each end of said hub, each lying in a plane perpendicular to the axis of said hub; said structures being remote from each other; fire-hose-engaging pieces associated with and supported on each structure and extending in planes perpendicular to said axis; said pieces being provided with continuous smooth faces, each smooth face at one end of the hub facing toward the faces at the other end of the hub; the pieces being supported on the structures for movement toward and from the associated structure, the pieces at one end of the hub being far enough from the pieces at the other end to receive superposed convolutions of the fire hose therebetween; and resilient means interposed between the hose engaging pieces and the associated supporting structure for yieldably resisting movement of the engaging pieces at each end of the hub from the engaging pieces at the other end of the hub to allow said fire hose between the engaging pieces to laterally expand as soon as water under pressure commences to pass through the hose.

13. A hose reel comprising a hub; a supporting structure mounted fast on each end of said hub, each lying in a plane substantially perpendicular to the axis of said hub; said structures being remote from each other; fire-hose engaging pieces associated with and supported on each structure and extending in planes perpendicular to said axis; said pieces being provided with continuous smooth faces, each smooth face at one end of the hub facing toward the faces at the other end of the hub; the pieces being supported on the structures for movement toward and from the associated structure, the pieces at one end of the hub being far enough from the pieces at the other end to receive superposed convolutions of the fire hose therebetween; winding drum segments substantially parallel to the axis of said hub and traversing said interspace; and a pair of longitudinal radial springs attaching each of said segments to said supporting structures respectively, the springs being more remote from the hub than are the segments; and resilient means interposed between the hose engaging pieces and the associated supporting structure for yieldably resisting movement of the engaging pieces at each end of the hub from the engaging pieces at the other end of the hub to allow said fire hose between the engaging pieces to expand as soon as water under pressure commences to pass through the hose.

14. A hose reel comprising a hub; a supporting structure mounted fast on each end of said hub, the outer part of each lying in a plane substantially perpendicular to the axis of said hub; said structures being remote from each other; fire-hose engaging pieces associated with and supported on the respective structures and extending in planes perpendicular to said axis; said pieces being provided with continuous smooth faces, each smooth face at one end of the hub facing toward the faces at the other end of the hub; the pieces being supported on the structures for movement toward and from the associated structure, the pieces at one end of the hub being far enough from the pieces at the other end to receive superposed convolutions of the fire hose therebetween; winding drum segment members substantially coaxial with the axis of said hub and traversing said interspace; and a pair of longitudinal radial springs attaching each of said segment members to said supporting structures respectively, the springs being more remote from the hub than is the segment; and resilient means engaging the hose engaging pieces and allowing yieldable movement on the respective associated supporting structures and yieldably resisting movement of the engaging pieces at each end of the hub from the engaging pieces at the other end of the hub to allow said fire hose between the engaging pieces to expand as soon as water under pressure commences to pass through the hose.

JAMES A. CRAIG.

REFERENCES CITED

The following references are of record in the file of this patent:

UNITED STATES PATENTS

| Number | Name | Date |
| --- | --- | --- |
| 946,681 | Montgomery et al. | Jan. 18, 1910 |
| 994,025 | Montgomery | May 30, 1911 |
| 1,341,003 | Pyburn | May 25, 1920 |
| 1,907,715 | Beplate | May 9, 1933 |
| 2,010,811 | Craig | Aug. 13, 1935 |
| 2,071,731 | Craig et al. | Feb. 23, 1937 |
| 1,492,291 | Giovannoni | Apr. 29, 1924 |
| 1,454,818 | Jones | May 8, 1923 |
| 1,943,512 | Becker | Jan. 16, 1934 |
| 988,766 | Frigon | Apr. 4, 1911 |

FOREIGN PATENTS

| Number | Country | Date |
| --- | --- | --- |
| 202,808 | Germany | Dec. 20, 1907 |